(12) United States Patent
Tsumagari (10) Patent No.: US 8,638,021 B2
(45) Date of Patent: Jan. 28, 2014

(54) ROTATING ELECTRICAL MACHINE

(75) Inventor: Hiroshi Tsumagari, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 334 days.

(21) Appl. No.: 12/959,384

(22) Filed: Dec. 3, 2010

(65) Prior Publication Data

US 2011/0169354 A1 Jul. 14, 2011

(30) Foreign Application Priority Data

Jan. 13, 2010 (JP) ................................. 2010-004579

(51) Int. Cl.
*H02K 1/06* (2006.01)
*H02K 17/00* (2006.01)
*H02K 19/14* (2006.01)
*H02K 5/00* (2006.01)

(52) U.S. Cl.
USPC ...... 310/216.046; 310/216.061; 310/216.063; 310/211; 310/411; 310/59

(58) Field of Classification Search
USPC ............ 310/216.043, 216.061, 216.063, 411, 310/417, 405, 406, 407, 156.78, 156.81, 310/211, 212, 59
IPC .................. H02K 9/00,1/06, 17/00, 19/14, 5/00
See application file for complete search history.

(56) References Cited

U.S. PATENT DOCUMENTS

| | | | | |
|---|---|---|---|---|
| 4,116,033 A | * | 9/1978 | Iwaki et al. | ...................... 72/142 |
| 4,894,904 A | * | 1/1990 | Tanaka et al. | ................... 29/598 |
| 5,127,148 A | * | 7/1992 | Lykes et al. | ...................... 29/596 |
| 6,226,856 B1 | | 5/2001 | Kazama et al. | |
| 6,891,290 B2 | | 5/2005 | Nagayama et al. | |
| 7,185,418 B2 | * | 3/2007 | Miyake et al. | ................... 29/606 |
| 2002/0153788 A1 | * | 10/2002 | Lin et al. | .......................... 310/89 |
| 2003/0127938 A1 | * | 7/2003 | Shen et al. | ..................... 310/216 |
| 2005/0082921 A1 | | 4/2005 | Schurter et al. | |
| 2007/0063593 A1 | * | 3/2007 | Braun et al. | ..................... 310/58 |
| 2010/0001612 A1 | | 1/2010 | Nagai et al. | |

FOREIGN PATENT DOCUMENTS

| | | | |
|---|---|---|---|
| CN | 1178410 | 4/1998 | |
| JP | 01-264548 | 10/1989 | |
| JP | 07-087714 | 3/1995 | |
| JP | 2004-364466 | 12/2004 | |
| JP | 2006-014463 | 1/2006 | |
| JP | WO2008139531 | * 11/2008 | ............... H02K 1/18 |
| JP | 2009-261248 | 11/2009 | |

OTHER PUBLICATIONS

Machine translation of WO2008139531, Nov. 2008, Nagai et al.*
Chinese Office Action for corresponding CN Application No. 201110008969.X, Oct. 29, 2012.

(Continued)

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

A rotating electrical machine includes a rotor and a stator including an annular stator core formed by helically stacking a plurality of core pieces that are connected to each other by connecting portions, the rotor being disposed inside an inner periphery of the stator core. The connecting portions are linearly arranged along a stacking direction of the stator core so that grooves that extend in the stacking direction of the stator core are formed in an outer peripheral surface of the stator core at positions where the connecting portions are provided.

18 Claims, 10 Drawing Sheets

(56) References Cited

OTHER PUBLICATIONS

Chinese Office Action for corresponding CN Application No. 201110008969.X, May 28, 2013.

Japanese Office Action for corresponding JP Application No. 2010-004579, Sep. 9, 2013.

Chinese Office Action for corresponding CN Application No. 201110008969.X, Sep. 4, 2013.

* cited by examiner

ROTATING ELECTRICAL MACHINE

CROSS-REFERENCE TO RELATED APPLICATIONS

The present application claims priority under 35 U.S.C. §119 to Japanese Patent Application No. 2010-004579 filed on Jan. 13, 2010. The contents of the application are incorporated herein by reference in their entirety.

BACKGROUND OF THE INVENTION

1. Field of the Invention

The present invention relates to a rotating electrical machine.

2. Description of the Related Art

Japanese Unexamined Patent Application Publication No. 1-264548 proposes a technique of manufacturing a stator core by helically stacking a band-shaped core. According to this technique, the band-shaped core that is helically stacked to form the stator core includes a plurality of core pieces connected to each other by connecting portions. The connecting portions are provided between outer peripheral portions of the core pieces.

SUMMARY OF THE INVENTION

A rotating electrical machine according to the present invention includes a rotor and a stator including an annular stator core formed by helically stacking a plurality of core pieces that are connected to each other by connecting portions, the rotor being disposed inside an inner periphery of the stator core. Each core piece includes a main core portion and a sub-core portion, the main core portion being provided at the inner periphery of the stator core and having a tooth portion at the inner periphery of the stator core, and the sub-core portion being provided at an outer periphery of main core portion. The core pieces are connected to each other by the connecting portions provided at boundaries between the main core portions and the sub-core portions. The connecting portions are arranged along a stacking direction of the stator core so that grooves that extend in the stacking direction of the stator core are formed in an outer peripheral surface of the stator core at positions where the connecting portions are provided.

DETAILED DESCRIPTION OF THE PREFERRED EMBODIMENTS

Embodiments will now be described with reference to the accompanying drawings, wherein like reference numerals designate corresponding or identical elements throughout the various drawings.

First Embodiment

Figure 1:
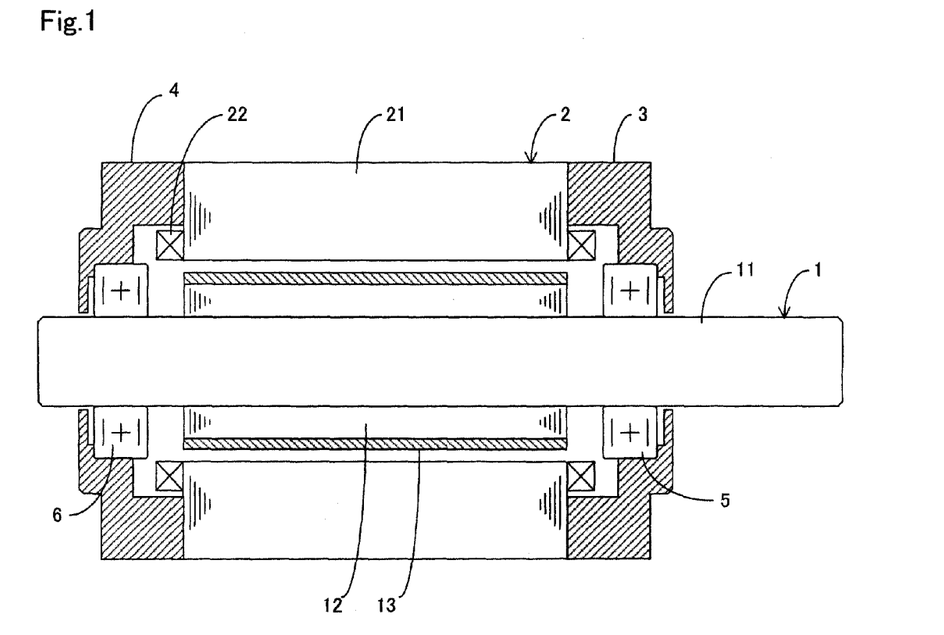
FIG. 1 is a diagram illustrating an example of the structure of a rotating electrical machine according to a first embodiment of the present invention.
Figure 2:
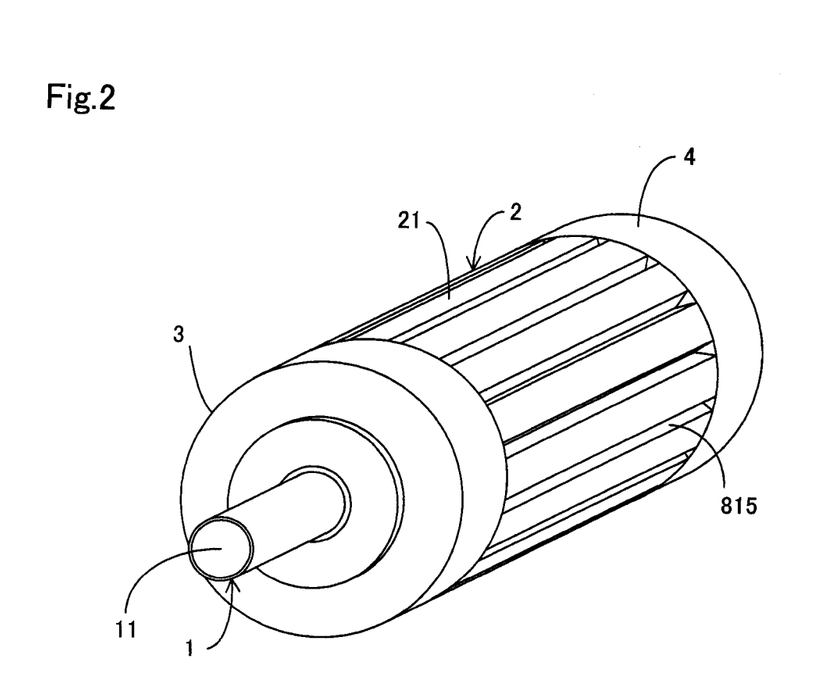
FIG. 2 is a perspective view of the rotating electrical machine illustrated in FIG. 1.

The structure of a rotating electrical machine according to a first embodiment of the present invention will be described with reference to FIGS. 1 and 2. FIG. 1 is a diagram illustrating an example of the structure of the rotating electrical machine according to the first embodiment of the present invention. FIG. 1 illustrates a side sectional view of the rotating electrical machine. FIG. 2 is a perspective view of the rotating electrical machine illustrated in FIG. 1. Referring to FIGS. 1 and 2, the rotating electrical machine includes a rotor 1, a stator 2, a load-side bracket 3, a counter-load-side bracket 4, a load-side bearing 5, and a counter-load-side bearing 6.

The rotor 1 includes a shaft 11, a rotor core 12, and a permanent magnet 13. The rotor core 12 has a cylindrical shape, and is provided on the outer periphery of the shaft 11, which has a columnar shape. The permanent magnet 13 is provided on the outer peripheral surface of the rotor core 12. In the present embodiment, the rotor 1 has an SPM structure in which the permanent magnet 13 is provided around the outer peripheral surface of the shaft 11. However, the rotor 1 may instead have an IPM structure or an IM structure. The stator 2 includes a stator core 21 and stator coils 22. The stator core 21 is provided so as to surround the outer periphery of the rotor core 12. The stator core 21 includes tooth portions at the inner periphery thereof, and the stator coils 22 are provided between the tooth portions. As illustrated in FIG. 2, a plurality of grooves 815 that extend in a rotation axis direction of the rotor 1 are formed in the outer peripheral surface of the stator core 21. The detailed structure of the stator core 21 will be described below. The rotor core 12 and the permanent magnet 13 rotate in the circumferential direction in response to a magnetic field generated by the stator coils 22. The load-side bracket 3 is provided at a load-side end of the stator core 21, which is an end of the stator core 21 in the rotation axis direction. The counter-load-side bracket 4 is provided at a counter-load-side end of the stator core 21, which is the other end of the stator core 21 in the rotation axis direction. The shaft 11 is rotatably supported by the load-side bearing 5, which is provided between the shaft 11 and the load-side bracket 3, and the counter-load-side bearing 6, which is provided between the shaft 11 and the counter-load-side bracket 4. The shaft 11 rotates together with the rotor core 12 and the permanent magnet 13.

Figure 3A:
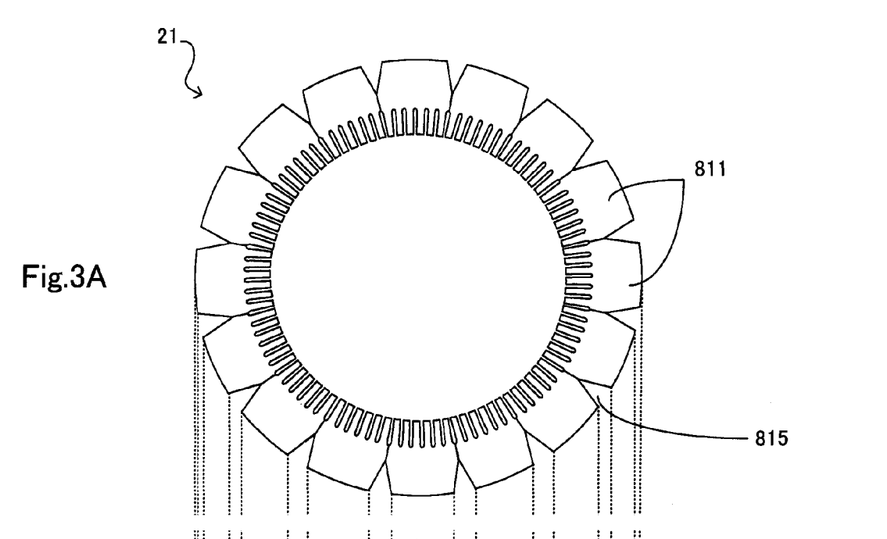
FIGS. 3A and 3B are diagrams illustrating an example of the structure of a stator core.
Figure 3B:
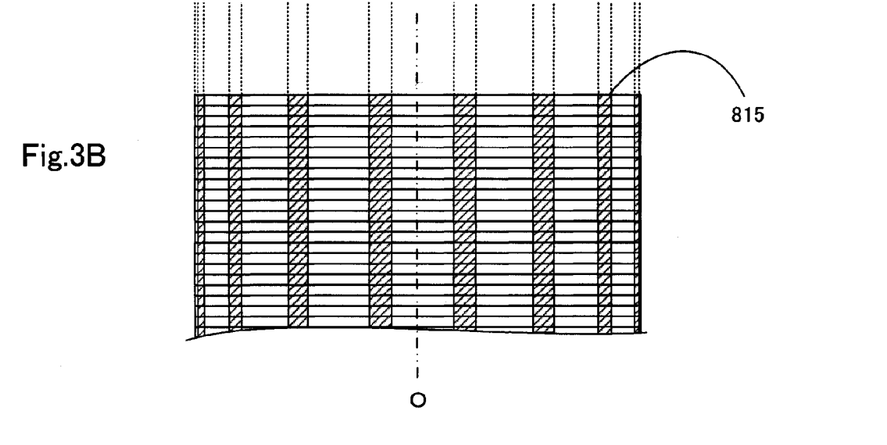
Figure 4:
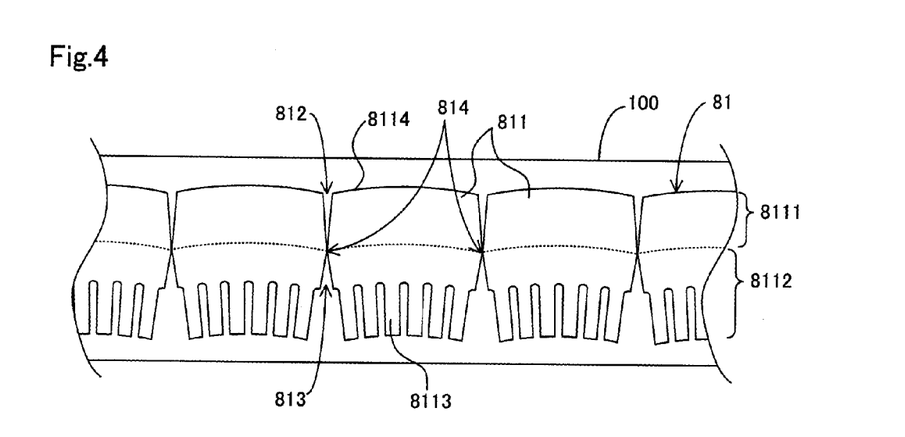
FIG. 4 is a diagram illustrating an example of a component of the stator core.

The detailed structure of the stator core 21 will now be described with reference to FIGS. 3A, 3B, and 4. FIGS. 3A and 3B are diagrams illustrating an example of the structure of the stator core 21. FIG. 3A is a front view of the stator core 21 viewed from the load side of the rotating electrical machine illustrated in FIG. 1, and FIG. 3B is a side view of the stator core 21 viewed from a side of the rotating electrical machine illustrated in FIG. 1. The two-dot chain line O in FIG. 3B is a straight line that is parallel to a stacking direction of the stator core 21, and indicates the rotation axis of the rotor 1. FIG. 4 is a diagram illustrating an example of a component of the stator core 21.

Referring to FIGS. 3A, 3B, and 4, the stator core 21 is produced by helically stacking a band-shaped core 81 that has been punched out from a band-shaped steel plate 100 by press working. The band-shaped core 81 is helically stacked such that main core portions 8112 face inward and tooth portions 8113 are placed on top of each other in an aligned manner. The band-shaped core 81 includes a plurality of core pieces 811 that are connected to each other by connecting portions 814. Each core piece 811 has a substantially arc shape. Each core piece 811 includes a sub-core portion 8111 for forming axial fins and the main core portion 8112 in which a plurality of tooth portions 8113 are formed. The main core portion 8112 corresponds to a core piece according to the related art. The width of each core piece 811 in the circumferential direction is set to a dimension corresponding to an angle having 360 as a multiple thereof. In other words, the number of tooth portions 8113 included in each core piece 811 has the total number of tooth portions 8113 in the stator core 21 as a multiple. Accordingly, the connecting portions 814 linearly extend in the stacking direction of the stator core 21. In the stacked state, the main core portions 8112 are at the inner periphery of the stator core 21, and the tooth portions 8113 face the central section of the stator core 21. In addition, in the stacked state, the sub-core portions 8111 are at the outer periphery of the stator core 21.

First cut portions 812 are formed between the adjacent sub-core portions 8111, and second cut portions 813 are formed between the adjacent main core portions 8112. Thus, the connecting portions 814, which have a small width in the radial direction, are formed between the sub-core portions 8111 and the main core portions 8112. In this example, all of the first cut portions 812 formed in the band-shaped core 81 have the same shape, and all of the second cut portions 813 formed in the band-shaped core 81 have the same shape. As described above, the connecting portions 814 are linearly arranged in the stacking direction. Therefore, in the stacked state, the first cut portions 812 are widened and form the grooves 815 that extend in the stacking direction, as illustrated in FIGS. 3A and 3B. The grooves 815 are formed in the outer peripheral surface of the stator core 21 at positions where the connecting portions 814 are provided. In addition, the sub-core portions 8111 form axial fins that extend in the stacking direction. In FIG. 4, reference numeral 8114 denotes outer peripheral portions of the sub-core portions 8111.

As described above, according to the present embodiment, the stator core 21 is produced by helically stacking the band-shaped core 81. Therefore, compared to the case in which a stator core is formed by stacking annular core pieces that have been punched out from a steel plate, an amount of the steel plate that is used can be reduced. In addition, the grooves 815 can be formed in the outer peripheral surface of the stator core 21. Accordingly, the cooling efficiency of the stator core 21 can be increased compared to that in the related art.

In addition, according to the present embodiment, the first cut portions 812 are widened in the stacked state to form the grooves 815. Accordingly, when the width of the grooves 815 in the circumferential direction of the stator core 21 is set to a predetermined width to achieve a desired cooling efficiency, the opening width of the first cut portions 812 can be set to a width that is smaller than the predetermined width. Therefore, there is also an advantage in that the size of a pressing die used to form the first cut portions 812 can be reduced, and the structure of the pressing die can be simplified.

In addition, according to the present embodiment, the core pieces 811 have the same structure, and each core piece 811 is provided with the connecting portions 814. Therefore, the intervals between the adjacent cut portions 812 are constant, and the grooves 815 are arranged at constant intervals in the circumferential direction of the stator core 21. Accordingly, reduction in the cooling efficiency in local areas of the stator core 21 can be prevented. In addition, according to the present embodiment, all of the first cut portions 812 have the same shape in the band-shaped core 81. Therefore, all of the grooves 815 have the same shape, and the stator core 21 can be uniformly cooled.

Figure 5:
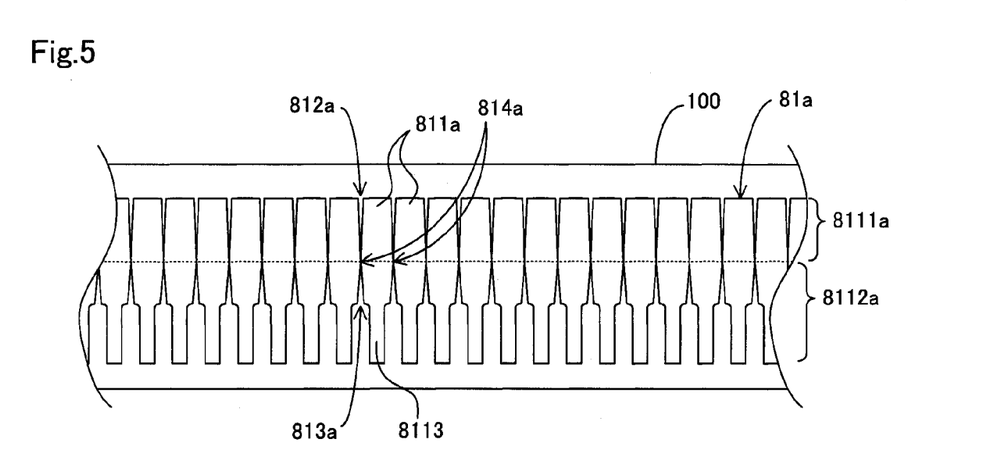
FIG. 5 is a diagram illustrating another example of the structure of core pieces.

In the above-described example, a plurality of tooth portions 8113 are formed in each main core portion 8112. However, the number of tooth portions 8113 in each main core portion 8112 is not limited. As illustrated in FIG. 5, each main core portion 8112 may include a single tooth portion 8113. FIG. 5 is a diagram illustrating another example of the structure of the core pieces. Referring to FIG. 5, a band-shaped core 81a is punched out from a band-shaped steel plate 100 by press working, and includes a plurality of core pieces 811a that are connected to each other by connecting portions 814a. Each core piece 811a has a substantially arc shape. Each core piece 811a includes a sub-core portion 8111a for forming axial fins and a main core portion 8112a in which a single tooth portion 8113 is formed. The number of tooth portions 8113 included in each core piece 811a has the total number of tooth portions 8113 in the stator core 21 as a multiple. Accordingly, the connecting portions 814a linearly extend in the stacking direction of the stator core 21. In the stacked state, the main core portions 8112a are at the inner periphery of the stator core 21, and the tooth portions 8113 face the central section of the stator core 21. In addition, in the stacked state, the sub-core portions 8111a are at the outer periphery of the stator core 21. First cut portions 812a are formed between the adjacent sub-core portions 8111a, and second cut portions 813a are formed between the adjacent main core portions 8112a. Thus, the connecting portions 814a, which have a small width in the radial direction, are formed between the sub-core portions 8111a and the main core portions 8112a. As described above, the connecting portions 814a are linearly arranged in the stacking direction. Therefore, in the stacked state, the first cut portions 812a are widened and form the grooves that extend in the stacking direction. The grooves are formed in the outer peripheral surface of the stator core 21 at positions where the connecting portions 814a are provided. In addition, the sub-core portions 8111a form axial fins that extend in the stacking direction.

Figure 6:
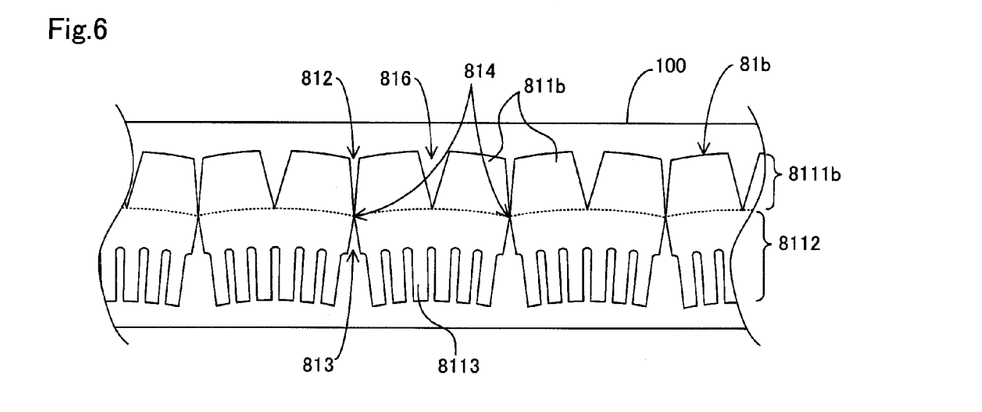
FIG. 6 is a diagram illustrating another example of the structure of core pieces.

In the above-described example, nothing is provided at the outer peripheral portions 8114 of the sub-core portions 8111. However, third cut portions 816 that form grooves may be additionally provided, as illustrated in FIG. 6. FIG. 6 is a diagram illustrating another example of the structure of the core pieces. FIG. 6 differs from FIG. 4 in that the band-shaped core 81 is replaced by a band-shaped core 81b, the sub-core portions 8111 are replaced by sub-core portions 8111b, the connecting portions 814 are replaced by connecting portions 814b, and third cut portions 816 are additionally provided. The third cut portions 816 are formed at the same position in the sub-core portions 8111b. Accordingly, since the connecting portions 814b are linearly arranged in the stacking direction, the third cut portions 816 form grooves that extend in the stacking direction in the stacked state. As a result, the surface area of the stator core 21 is further increased and the cooling efficiency is increased accordingly. Referring to FIG. 6, the third cut portions 816 are formed at, for example, the centers between the first cut portions 812. In this case, the grooves 815 formed by the first cut portions 812 and the grooves formed by the third cut portions 816 are arranged at constant intervals in the circumferential direction of the stator core 21. As a result, reduction in the cooling efficiency in local areas of the stator core 21 can be prevented. The shape of the third cut portions 816 is similar to that of the first cut portions 812 except for an opening angle thereof, and the opening angle of the third cut portions 816 is set to be equal to an opening angle of the first cut portions 812 in the stacked state. In this case, all of the grooves have the same shape, and the stator core 21 can be uniformly cooled. The third cut portion 816 may be provided in a plurality in each sub-core portion 8111b.

Second Embodiment

Figure 7:
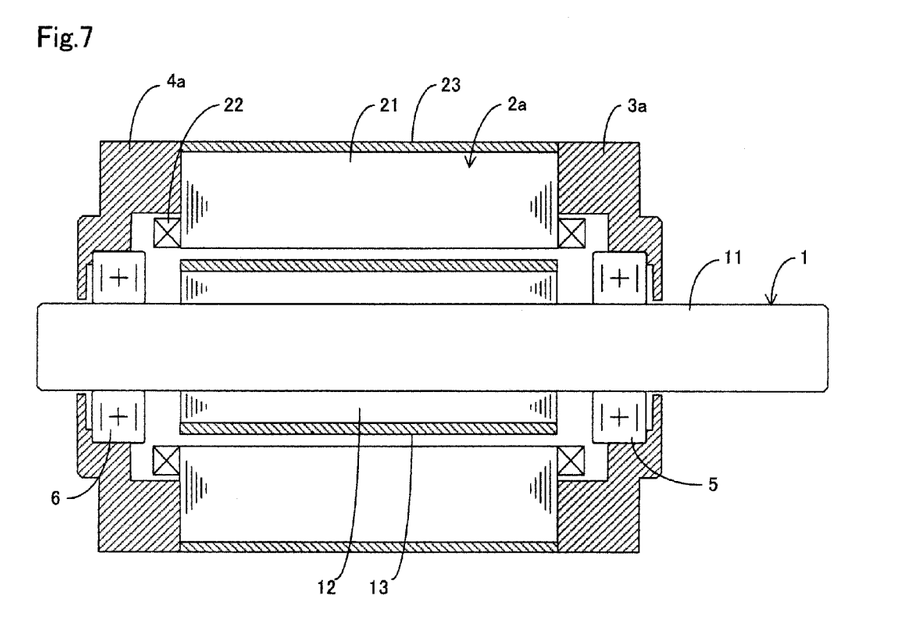
FIG. 7 is a diagram illustrating an example of the structure of a rotating electrical machine according to a second embodiment of the present invention.
Figure 8:
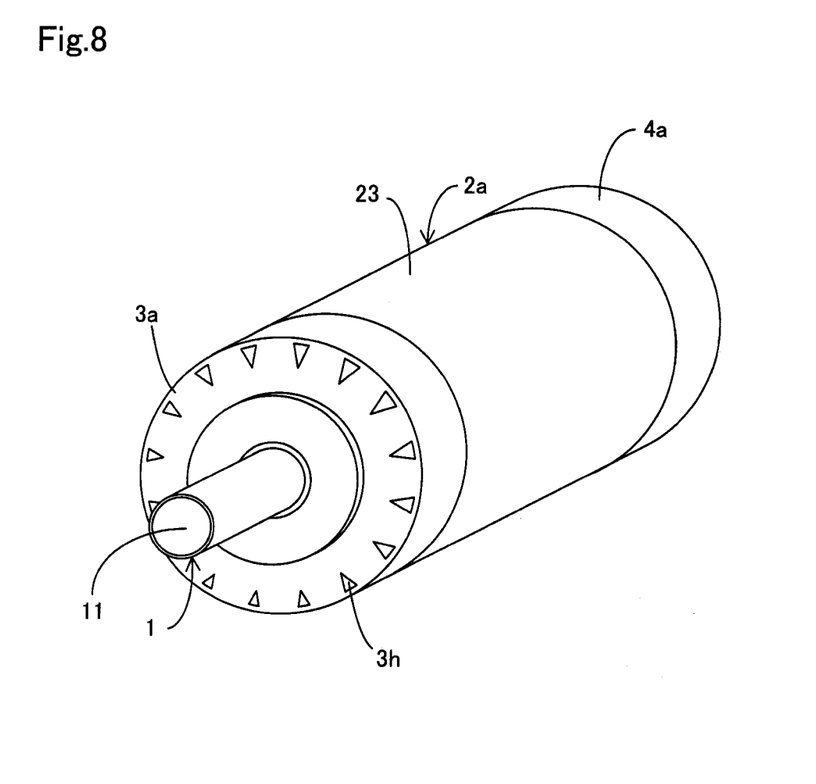
FIG. 8 is a perspective view of the rotating electrical machine illustrated in FIG. 7.

The structure of a rotating electrical machine according to a second embodiment of the present invention will now be described. The rotating electrical machine according to the present embodiment differs from the rotating electrical machine illustrated in FIG. 1 in that a frame is provided on a stator and in that a load-side bracket and a counter-load-side bracket are provided with through holes. The difference will now be described with reference to FIGS. 7 and 8. FIG. 7 is a diagram illustrating an example of the structure of the rotating electrical machine according to the second embodiment of the present invention. FIG. 7 illustrates a side sectional view of the rotating electrical machine. FIG. 8 is a perspective view of the rotating electrical machine illustrated in FIG. 7. In FIGS. 7 and 8, components similar to those in FIGS. 1 and 2 are denoted by the same reference numerals. Referring to FIGS. 7 and 8, the rotating electrical machine includes a rotor 1, a stator 2a, a load-side bracket 3a, a counter-load-side bracket 4a, a load-side bearing 5, and a counter-load-side bearing 6.

The stator 2a includes a stator core 21, stator coils 22, and a frame 23. As illustrated in FIG. 2, a plurality of grooves 815 that extend in a rotation axis direction of the rotor 1 are formed in the outer peripheral surface of the stator core 21. The frame 23 is provided at the outer periphery of the stator core 21. The load-side bracket 3a is provided at a load-side end of the frame 23 and the stator core 21, which is an end of the frame 23 and the stator core 21 in the rotation axis direction. As illustrated in FIG. 8, the load-side bracket 3a has through holes 3h that extend through the load-side bracket 3a in the rotation axis direction of the rotor 1 at positions where the through holes 3h communicate with spaces in the grooves 815. In the example illustrated in FIG. 8, the shape of the through holes 3h is similar to the shape of the grooves 815 (triangular shape). The shape of the through holes 3h is not limited to the triangular shape, and may instead be other shapes. The counter-load-side bracket 4a is provided at a counter-load-side end of the frame 23 and the stator core 21, which is the other end of the frame 23 and the stator core 21 in the rotation axis direction. Although not illustrated in FIG. 8, the counter-load-side bracket 4a has through holes that extend through the counter-load-side bracket 4a in the rotation axis direction at positions where the through holes communicate with the spaces in the grooves 815. Thus, the through holes 3h in the load-side bracket 3a, the spaces surrounded by the inner peripheral surface of the frame 23 and the grooves 815, and the through holes in the counter-load-side bracket 4a communicate with each other and form individual cooling channels.

According to the present embodiment, since the cooling channels are formed, a liquid cooling structure in which cooling liquid, for example, is used can be easily provided.

The cooling structure of the rotating electrical machine according to the present embodiment is not limited to the liquid cooling structure, and may instead be a gas cooling structure which cools the rotating electrical machine using the cooling channels and cooling gas.

Third Embodiment

Figure 9:
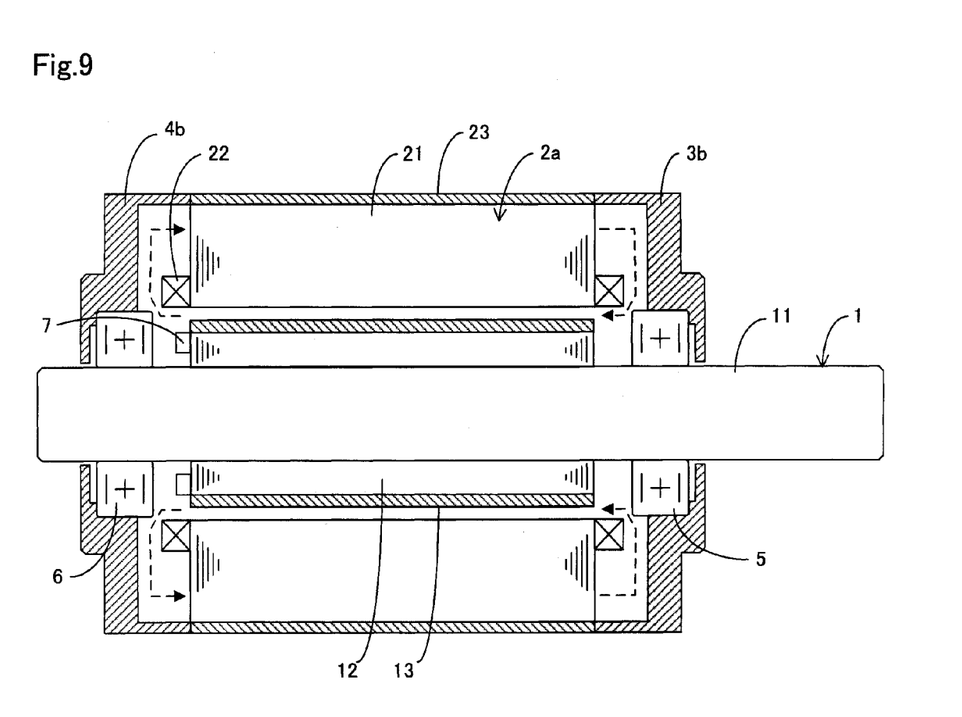
FIG. 9 is a diagram illustrating an example of the structure of a rotating electrical machine according to a third embodiment of the present invention.
Figure 10:
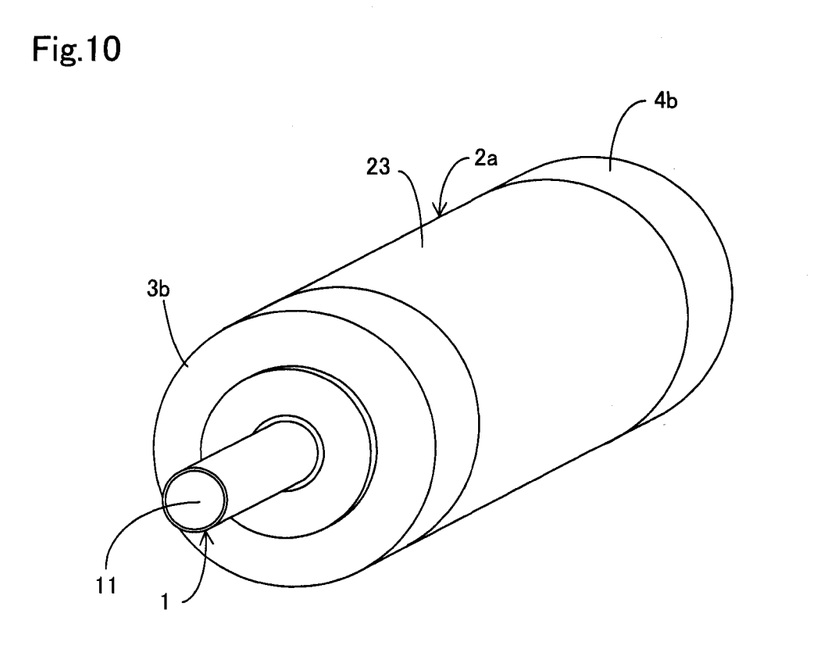
FIG. 10 is a perspective view of the rotating electrical machine illustrated in FIG. 9.

The structure of a rotating electrical machine according to a third embodiment of the present invention will now be described. The rotating electrical machine according to the present embodiment differs from the rotating electrical machine illustrated in FIG. 1 in that a frame is provided on a stator and in that cooling fins are provided to circulate gas in the rotating electrical machine. The difference will now be described with reference to FIGS. 9 and 10. FIG. 9 is a diagram illustrating an example of the structure of the rotating electrical machine according to the third embodiment of the present invention. FIG. 9 illustrates a side sectional view of the rotating electrical machine. FIG. 10 is a perspective view of the rotating electrical machine illustrated in FIG. 9. In FIGS. 9 and 10, components similar to those in FIGS. 1 and 2 are denoted by the same reference numerals. Referring to FIGS. 9 and 10, the rotating electrical machine includes a rotor 1, a stator 2a, a load-side bracket 3b, a counter-load-side bracket 4b, a load-side bearing 5, a counter-load-side bearing 6, and cooling fins 7.

The stator 2a includes a stator core 21, stator coils 22, and a frame 23. As illustrated in FIG. 2, a plurality of grooves 815 that extend in a rotation axis direction of the rotor 1 are formed in the outer peripheral surface of the stator core 21. The frame 23 is provided at the outer periphery of the stator core 21. The load-side bracket 3b is provided at a load-side end of the frame 23, which is an end of the frame 23 in the rotation axis direction. The counter-load-side bracket 4b is provided at a counter-load-side end of the frame 23, which is the other end of the frame 23 in the rotation axis direction. Referring to FIG. 9, the thickness of a portion of the load-side bracket 3b that faces the stator core 21 in the rotation axis direction is smaller than that in the load-side bracket 3 illustrated in FIG. 1. The load-side bracket 3b is provided only at the load-side end of the frame 23. Similarly, the thickness of a portion of the counter-load-side bracket 4b that faces the stator core 21 in the rotation axis direction is smaller than that in the counter-load-side bracket 4 illustrated in FIG. 1. The counter-load-side bracket 4b is provided only at the counter-load-side end of the frame 23. Thus, cooling channels defined by spaces surrounded by the inner peripheral surface of the frame 23 and the grooves 815 are connected to the space surrounded by the inner peripheral surface of the stator 2a.

A plurality of cooling fins 7 are provided along the circumferential direction at the counter load side of the rotor core 12. The cooling fins 7 rotate together with the rotor 1. The cooling channels defined by the spaces surrounded by the inner peripheral surface of the frame 23 and the grooves 815 are connected to the space surrounded by the inner peripheral surface of the stator 2a. Therefore, when the cooling fins 7 rotate, gas in the rotating electrical machine circulates along directions shown by the dashed arrows in FIG. 9.

As described above, according to the present embodiment, the gas in the rotating electrical machine circulates. Therefore, the cooling efficiency can be further increased.

In the above-described example, the cooling fins 7 are provided at the counter load side of the rotor core 12. However, the position of the cooling fins 7 is not limited to this. The cooling fins 7 may be provided at the load side of the rotor core 12, or on the outer periphery of the shaft 11. Alternatively, the cooling fins 7 may be included in a cooling fan that is provided separately from the rotor 1. The gas in the rotating electrical machine may be circulated along directions opposite to the directions shown by the dashed arrows in FIG. 9.

The above-described rotating electrical machines according to the first to third embodiments may be used in any types of motors and generators. For example, the rotating electrical machines may be used in motors for raising-and-lowering apparatuses (such as elevators), motors for processing machines (such as machine tools), motors and generators for vehicles, aerogenerators, and other various industrial motors and generators.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A rotating electrical machine comprising:
a rotor; and
a stator including an annular stator core formed by helically stacking a plurality of core pieces that are connected to each other by connecting portions, the rotor being disposed inside an inner periphery of the stator core,
wherein each of the core pieces includes a main core portion and a sub-core portion, the main core portion being provided at the inner periphery of the stator core and having a tooth portion at the inner periphery of the stator core, the sub-core portion being provided at an outer periphery of main core portion, the tooth portions of the main core portions being spaced apart from each other in a circumferential direction of the stator core to define slots between the tooth portions,
wherein the core pieces are connected to each other by the connecting portions provided at boundaries between the main core portions and the sub-core portions,
wherein the connecting portions are arranged along a stacking direction of the stator core so that first grooves that extend in the stacking direction of the stator core are formed in an outer peripheral surface of the stator core at positions where the connecting portions are provided,
wherein a maximum width of the first grooves in the circumferential direction is greater than a maximum width of the slots in the circumferential direction,
wherein the stator includes a frame provided at an outer periphery of the stator core, and
wherein the rotating electrical machine further comprises:
brackets provided at either end of the frame and the stator core in the stacking direction of the stator core, the brackets having through holes that extend through the brackets in the stacking direction at positions where the through holes communicate with spaces in the first grooves.

2. The rotating electrical machine according to claim 1, wherein the first grooves have the same shape.

3. The rotating electrical machine according to claim 1, wherein second grooves that extend in the stacking direction of the stator core are formed in the outer peripheral surface of the stator core at positions other than the positions where the connecting portions are provided, and
wherein the first and second grooves are arranged at constant intervals in the circumferential direction of the stator core.

4. The rotating electrical machine according to claim 3, wherein the first and second grooves have the same shape.

5. The rotating electrical machine according to claim 3, wherein a maximum width of the second grooves in the circumferential direction is greater than the maximum width of the slots in the circumferential direction.

6. The rotating electrical machine according to claim 3, wherein a maximum depth of the second grooves in a radial direction of the stator core is greater than the maximum width of the slots in the circumferential direction.

7. The rotating electrical machine according to claim 1, wherein a maximum depth of the first grooves in a radial direction of the stator core is greater than the maximum width of the slots in the circumferential direction.

8. The rotating electrical machine according to claim 1, wherein the first grooves have a triangular cross-sectional shape.

9. A rotating electrical machine comprising:
a rotor; and
a stator including an annular stator core formed by helically stacking a plurality of core pieces that are connected to each other by connecting portions, the rotor being disposed inside an inner periphery of the stator core,
wherein each of the core pieces includes a main core portion and a sub-core portion, the main core portion being provided at the inner periphery of the stator core and having a tooth portion at the inner periphery of the stator core, the sub-core portion being provided at an outer periphery of main core portion, the tooth portions of the main core portions being spaced apart from each other in a circumferential direction of the stator core to define slots between the tooth portions,
wherein the core pieces are connected to each other by the connecting portions provided at boundaries between the main core portions and the sub-core portions,
wherein the connecting portions are arranged along a stacking direction of the stator core so that first grooves that extend in the stacking direction of the stator core are formed in an outer peripheral surface of the stator core at positions where the connecting portions are provided,
wherein a maximum width of the first grooves in the circumferential direction is greater than a maximum width of the slots in the circumferential direction,
wherein the stator includes a frame provided at an outer periphery of the stator core, and
wherein the rotating electrical machine further comprises:
brackets provided at either end of the frame in the stacking direction of the stator core; and
a cooling fin provided in a space surrounded by an inner peripheral surface of the stator core and the brackets, the cooling fin rotating together with the rotor.

10. A rotating electrical machine comprising:
a rotor; and
a stator including an annular stator core formed by helically stacking a plurality of core pieces that are connected to each other by connecting portions, the rotor being disposed inside an inner periphery of the stator core, the connecting portions being arranged along a stacking direction of the stator core so that first grooves that extend in the stacking direction of the stator core are formed in an outer peripheral surface of the stator core at positions where the connecting portions are provided, each of the core pieces including a tooth portion at the inner periphery of the stator core, the tooth portions of the core pieces being spaced apart from each other in a circumferential direction of the stator core to define slots between the tooth portions, a maximum width of the first grooves in the circumferential direction being greater than a maximum width of the slots in the circumferential direction, wherein the stator includes a frame provided at an outer periphery of the stator core, and wherein the rotating electrical machine further comprises:
brackets provided at either end of the frame and the stator core in the stacking direction of the stator core, the brackets having through holes that extend through the brackets in the stacking direction at positions where the through holes communicate with spaces in the first grooves.

11. The rotating electrical machine according to claim 10, wherein the first grooves have the same shape.

12. The rotating electrical machine according to claim 10, wherein second grooves that extend in the stacking direction of the stator core are formed in the outer peripheral surface of the stator core at positions other than the positions where the connecting portions are provided, and wherein the first and second grooves are arranged at constant intervals in the circumferential direction of the stator core.

13. The rotating electrical machine according to claim 12, wherein the first and second grooves have the same shape.

14. The rotating electrical machine according to claim 12, wherein a maximum width of the second grooves in the circumferential direction is greater than the maximum width of the slots in the circumferential direction.

15. The rotating electrical machine according to claim 12, wherein a maximum depth of the second grooves in a radial direction of the stator core is greater than the maximum width of the slots in the circumferential direction.

16. The rotating electrical machine according to claim 10, wherein a maximum depth of the first grooves in a radial direction of the stator core is greater than the maximum width of the slots in the circumferential direction.

17. The rotating electrical machine according to claim 10, wherein the first grooves have a triangular cross-sectional shape.

18. A rotating electrical machine comprising:
a rotor; and
a stator including an annular stator core formed by helically stacking a plurality of core pieces that are connected to each other by connecting portions, the rotor being disposed inside an inner periphery of the stator core, the connecting portions being arranged along a stacking direction of the stator core so that first grooves that extend in the stacking direction of the stator core are formed in an outer peripheral surface of the stator core at positions where the connecting portions are provided, each of the core pieces including a tooth portion at the inner periphery of the stator core, the tooth portions of the core pieces being spaced apart from each other in a circumferential direction of the stator core to define slots between the tooth portions, a maximum width of the first grooves in the circumferential direction being greater than a maximum width of the slots in the circumferential direction, wherein the stator includes a frame provided at an outer periphery of the stator core, and wherein the rotating electrical machine further comprises:
brackets provided at either end of the frame in the stacking direction of the stator core; and
a cooling fin provided in a space surrounded by an inner peripheral surface of the stator core and the brackets, the cooling fin rotating together with the rotor.

\* \* \* \* \*